Oct. 1, 1957 — L. BLUM — 2,807,834

ANCHORS FOR ORNAMENTAL RAILS

Filed Aug. 25, 1953

INVENTOR.
Louis Blum
BY William B. Jaspert
Attorney

United States Patent Office 2,807,834
Patented Oct. 1, 1957

2,807,834

ANCHORS FOR ORNAMENTAL RAILS

Louis Blum, Pittsburgh, Pa., assignor to Blumcraft of Pittsburgh, Pittsburgh, Pa., a firm Application August 25, 1953, Serial No. 376,453

3 Claims. (Cl. 20—10)

This invention relates to new and useful improvements in wall brackets, more particularly to brackets for mounting ornamental rails on stairs and the like, and it is among the objects thereof to provide a wall bracket assembly which shall embody interlocking means with complementary shaped elements of rail structures whereby the rail is free and only a minimum number of rail engaging and locking elements are required.

The invention will become more apparent from a consideration of the accompanying drawing constituting a part hereof, in which like reference characters designate like parts, and in which Figure 1 is an end elevational view, partially in cross section, of a wall bracket and rail mounting member embodying the principles of this invention;

Figure 1:
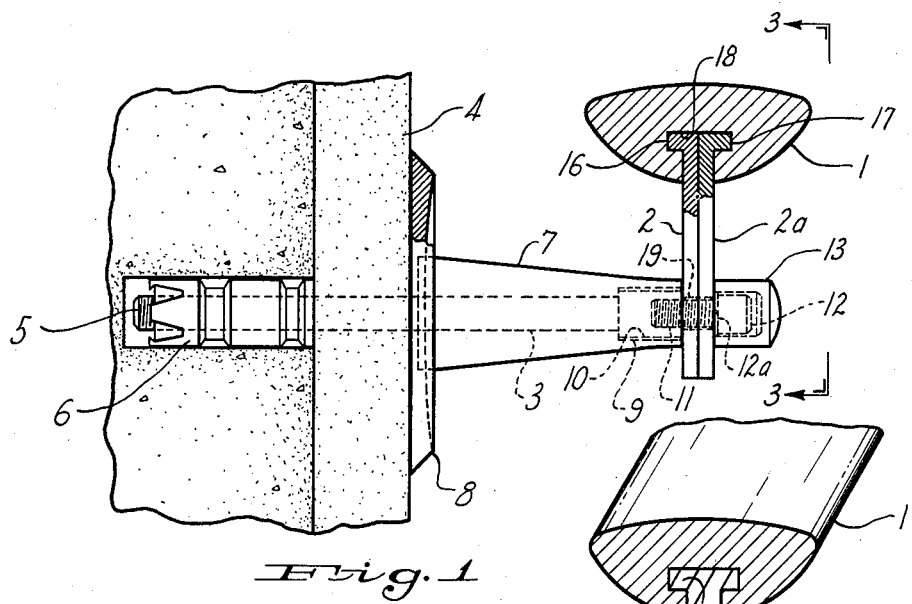

With reference to the several figures of the drawing, the numeral 1 designates a hand rail for stairways or the like, and 2 and 2a the mounting for the rail which is secured to a support consisting of a long shanked screw 3 that is inserted through a wall 4, Figure 1, and has a threaded end 5 that interacts with a screw sleeve or nut 6 on the inside of the wall. This may be an expansion nut as is in conventional use.

A conical spacer sleeve 7 is slipped over the shank of screw 3 and abuts a decorative plate 8 to hold it against the wall 4 as shown in Figure 1. The sleeve 7 is provided with a recess 9 that receives the head 10 of the screw 3. The head 10 is provided with a threaded portion 11 for receiving a bolt 12 and an ornamental cap 13 covers the end of the bolt 12 as shown in the assembled view of Figure 1.

No claim is made for any particular novelty in the structure so far described, the invention residing in the use of a pair of clamping members 2 and 2a having relatively long shanks and having offset or shoulder portions 16 and 17 that fit into a T-slot 18 of the ornamental rail 1.

Figure 2:
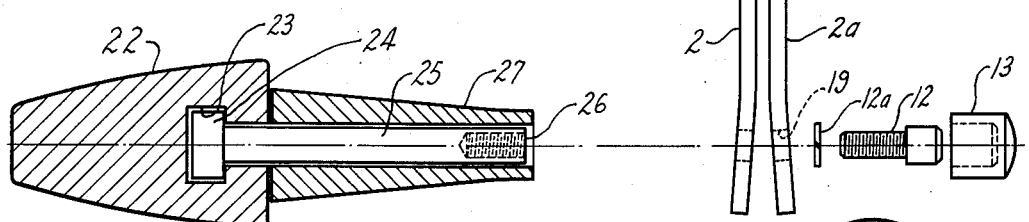
Figure 2 is an exploded view, with the parts shown partially in cross section and partially in elevation of the bracket mounted on a post.

As shown in Figure 2, the shank portions 2 and 2a may be slightly bent out of line so that when they are assembled in the T-slots 18 they will be spread at the bottom ends. The shank portions 2 and 2a are provided with openings 19 for receiving the screw bolt 12.

Before assembling the rail with the clamp members 2 and 2a, the wall bracket assembly is completed so that the screw bolt 3 is firmly secured in the wall. The screw bolt 12 is then slipped through a lock washer 12a and the openings 19 of the clamp members 2 and 2a are drawn up tight, bringing the divergent ends of the shanks 2 and 2a together thereby asserting a spreading action at heads 16 and 17 inside of the T-slot 18 of the rail to firmly lock and secure the same. When the screw bolt 12 has been snugly drawn up the shanks 2 and 2a will be straight as shown in Figure 1 and the cap 13 is slid over the head of the bolt 12, thus completing the assembly for the ornamental rail.

Figures 3, 4, 5:
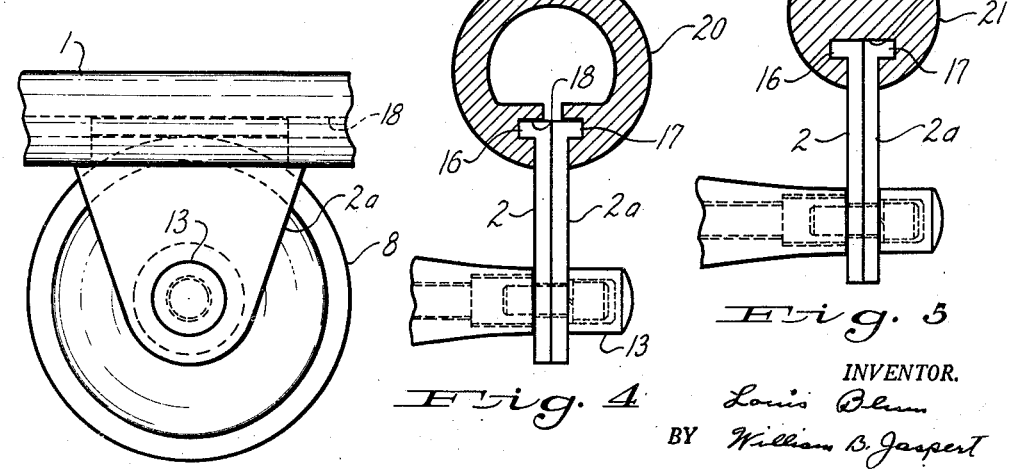
Figure 3 is a side elevational view of a portion of the rail and mounting bracket viewed along the line 3—3 of Figure 1.
Figure 4 is an elevational view, partially in cross section of a portion of the mounting bracket employed with a modified form of hand rail.
Figure 5 is a similar view of still another modification of the rail structure.

As shown in Figure 3 of the drawing, the clamping members 2 and 2a may be of wedge shape and thereby supply or provide a relatively large contacting area of the head portions 16 and 17 with the T-slots in the rails 1.

As shown in Figures 4 and 5, these same clamping elements 2 and 2a may be shown with hollow cylindrical type of rails 20 or solid rails 21, or in fact any other shape of rails in which T-slots are provided to receive the clamping elements.

In the modification shown in Figure 2, the rail supports 2 and 2a are mounted on an upright or post 22 which has a T-slot 23 for receiving the head 24 of a bolt 25 having a threaded recess 26 for receiving the screw 12. A sleeve 27 spaces the rail supports 2 and 2a a suitable distance from the post 22. The assembly of the rail 1 to the supports 2 and 2a is otherwise the same as in the structure of Figure 1.

Although several embodiments of the invention have been herein illustrated and described, it will be evident to those skilled in the art that various modifications may be made in the details of construction without departing from the principles herein set forth.

I claim:

1. The combination of a hand rail having a T-slot extending longitudinally therein and a support therefor consisting of a pair of L-shaped clamping members with their short legs disposed in opposite directions in the T-head of the rail slot and their shank portions extending therefrom in back-to-back relation, the said shank portions being flared outwardly and provided with means for clamping on a supporting bracket, said clamping means acting to draw said diverging shank portions toward each other to exert clamping pressure of the short legs of the supports in the T-head of the rail.

2. A rail anchor comprising juxtaposed L-shaped bars in back-to-back relation with the short legs of the L disposed in opposite directions for insertion in the T-slot of a rail, the long legs of said bars flaring outwardly and provided with means for receiving clamping members to draw said outwardly flared portions toward each other to assert clamping pressure of the L members in the T-slot of the rail.

3. A rail anchor comprising a disc shape wall plate having a spacing shank at the front end thereof, a bolt having a body portion extending through said shank and to the rear of said plate with attaching means for fastening said bolt and said bolt having a threaded end for receiving a screw for mounting a rail support and for simultaneously fastening the spacing shank and plate in butting engagement, said rail support comprising inverted L-shaped bars in back-to-back relation with the short legs thereof disposed in opposite directions for inserting in a T-slot of a rail, the long legs of said bars flaring outwardly and having openings for receiving said mounting screw to draw said legs together.

References Cited in the file of this patent

UNITED STATES PATENTS

| D. 135,578 | Marschner | Apr. 27, 1943 |
| 163,996 | Hardy | June 1, 1875 |
| 1,220,021 | Smyrk | Mar. 20, 1917 |
| 1,474,835 | Hogan | Nov. 20, 1923 |

FOREIGN PATENTS

| 477,940 | France | Aug. 19, 1915 |
| 462,115 | Germany | July 3, 1928 |